J. W. THROPP.
THRUST BEARING.
APPLICATION FILED DEC. 19, 1918.
1,337,028.
Patented Apr. 13, 1920.
3 SHEETS—SHEET 1.
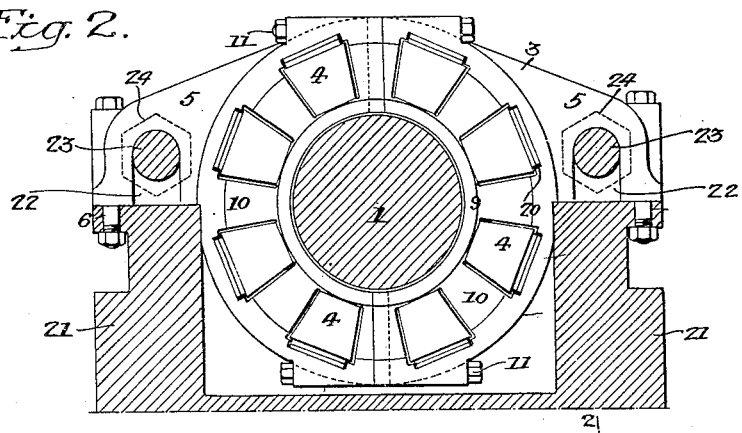
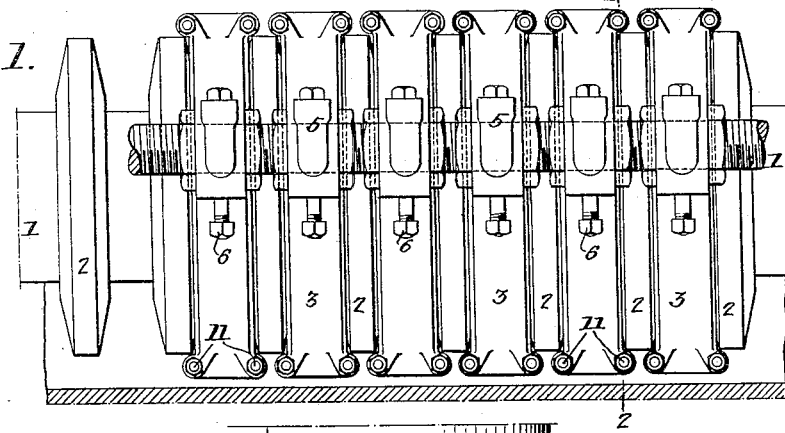
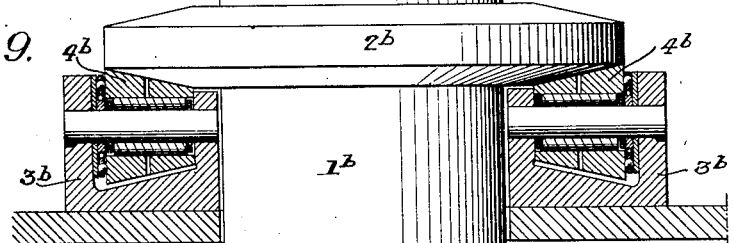
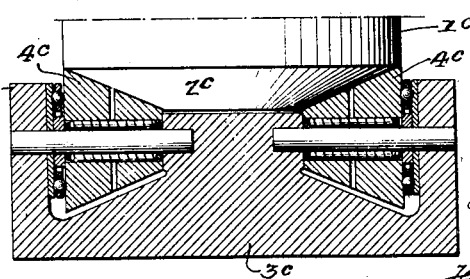
Inventor:
Joseph W. Thropp,
by his Attorneys,
Howson & Howson J. W. THROPP.
THRUST BEARING.
APPLICATION FILED DEC. 19, 1918.
1,337,028.
Patented Apr. 13, 1920.
3 SHEETS—SHEET 2.
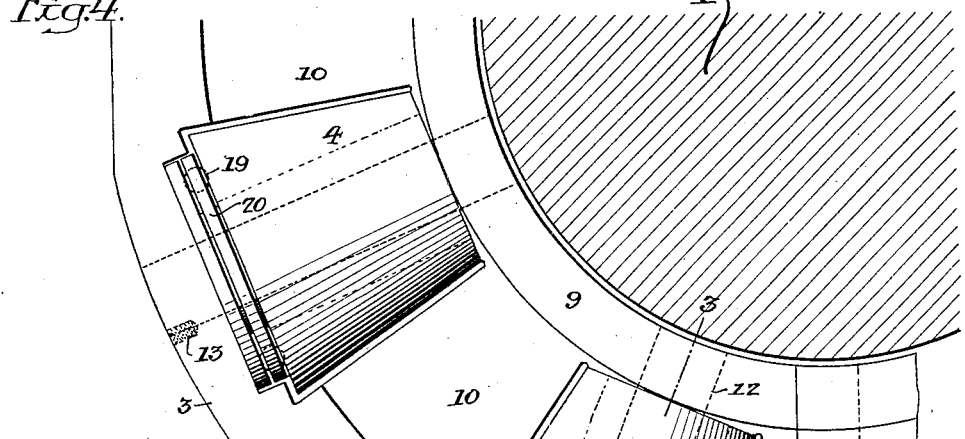
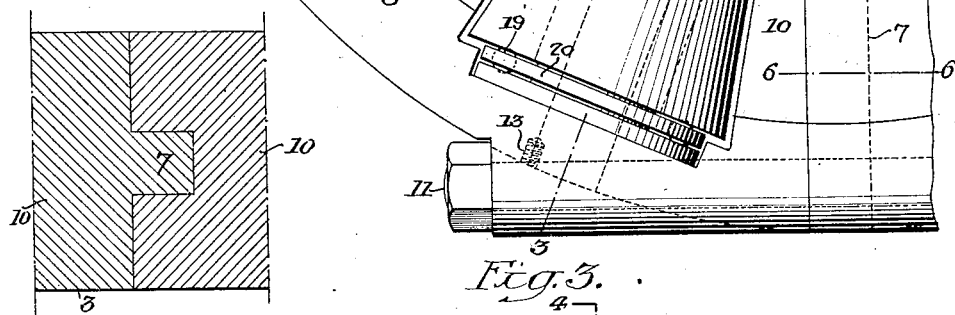
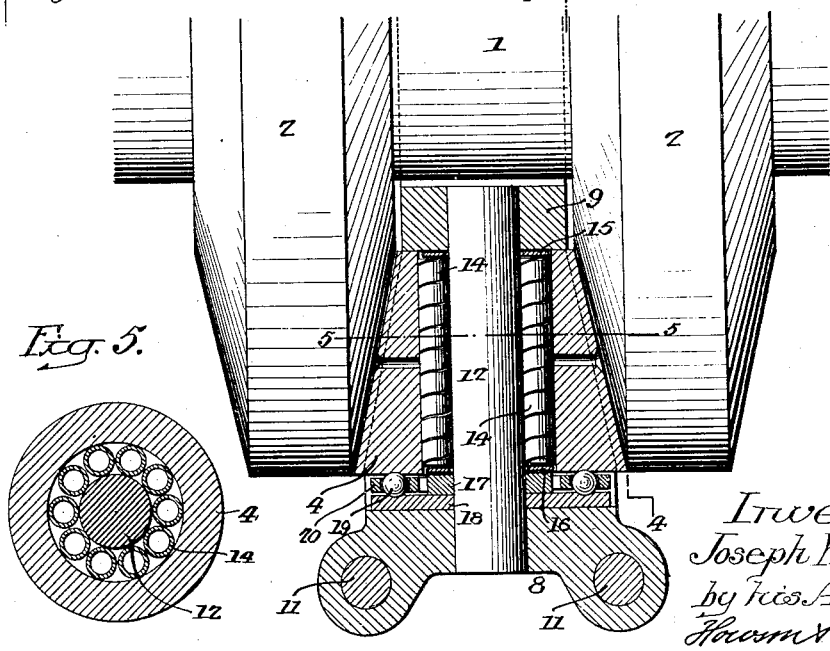
Inventor:
Joseph W. Thropp.
by his Attorneys

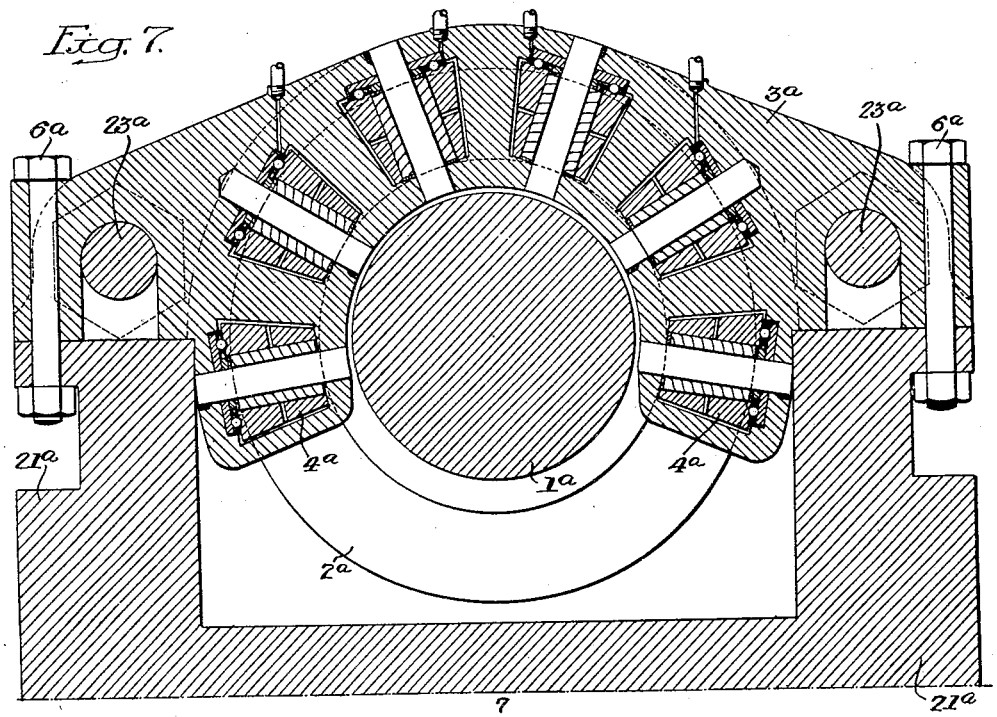
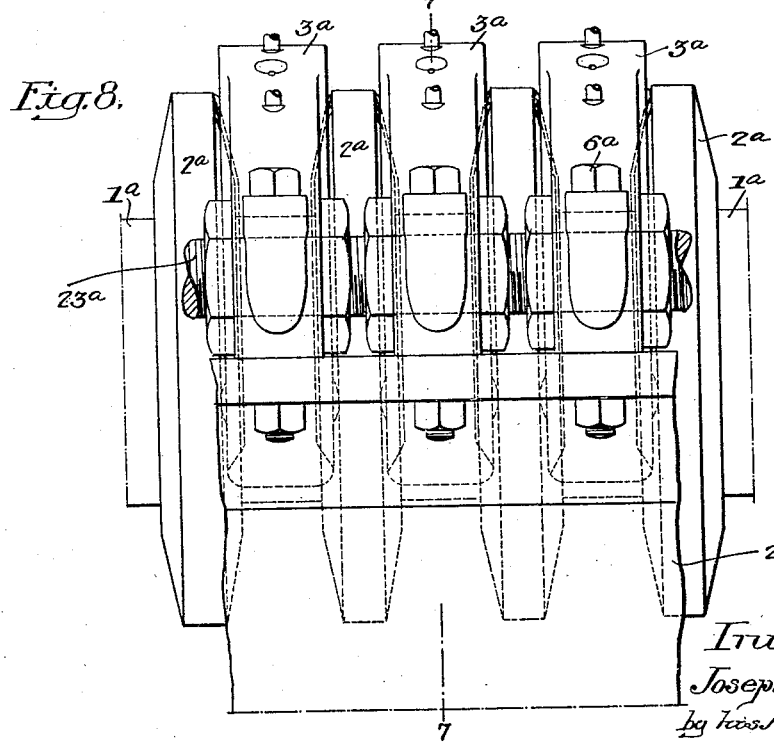

UNITED STATES PATENT OFFICE.

JOSEPH W. THROPP, OF TRENTON, NEW JERSEY.

THRUST-BEARING.

1,337,028.

Specification of Letters Patent.   Patented Apr. 13, 1920.

Application filed December 19, 1918.   Serial No. 267,520.

*To all whom it may concern:*

Be it known that I, JOSEPH W. THROPP, a citizen of the United States, and a resident of Trenton, county of Mercer, State of New Jersey, have invented certain Improvements in Thrust-Bearings, of which the following is a specification.

My invention relates particularly to thrust bearings of propeller shafts of vessels, but it will be understood that the invention can be applied to any thrust bearing or step bearing.

One object of my invention is to reduce friction and to make a substantial roller bearing which will take the thrust of exceptionally heavy shafts.

A further object of the invention is to provide a roller bearing with a heavy spindle properly supported and to provide anti-friction devices between the roller and the spindle and independent anti-friction devices between the end of the roller and the cage, or frame, on which the rollers are mounted.

In the accompanying drawings:

Figure 1 is a longitudinal view of a propeller shaft, showing a series of thrust bearing units in position;

Fig. 2 is a sectional view on the line 2—2, Fig. 1;

Fig. 3 is an enlarged sectional view on the line 3—3, Fig. 4, of one of the roller bearings;

Fig. 4 is a transverse sectional view on the line 4—4, Fig. 3;

Fig. 5 is a sectional view of one of the rollers on the line 5—5, Fig. 3;

Fig. 6 is a sectional view on the line 6—6, Fig. 4;

Fig. 7 is a sectional view on the line 7—7, Fig. 8, illustrating a construction in which the bearing section can be readily detached from the shaft;

Fig. 8 is a side view of the construction shown in Fig. 7; and

Figs. 9 and 10 are views illustrating my invention as applied to thrust step bearings.

Referring to Figs. 1 to 6, inclusive, of the drawings, 1 is a horizontal shaft of a propeller. 2, 2 are the collars forming an integral part of the shaft, in the present instance. These collars are tapered in cross section, as shown. 3 is a series of cages in which are mounted the conical rollers 4, which are located in the spaces between the collars, as clearly shown in the drawings. Each of these cages, in the present instance, has lateral extensions 5 shaped to rest upon a fixed member 21 of the permanent structure of the bearing and are secured firmly thereto by bolts 6. The extensions are recessed at 22 to fit over heavy screw threaded rods 23 extending longitudinally of the bearings. Nuts 24 are located on the rods on each side of the extension 5 and are for the purpose of adjustably retaining the bearing cages 3 in proper position in respect to the collars of the shaft. Other constructions may be used, according to the type of bearing to which my invention is applied.

The cage 3 consists of an outer bearing ring 8 and an inner bearing ring 9 connected by webs 10, making a very substantial structure. As shown in Fig. 2, each cage is made in two parts. One part has a tongue 7 adapted to a groove in the other part (Fig. 6) and the parts are connected by transverse bolts 11. By this construction several cages can be readily mounted on the shaft and secured rigidly in position. The construction also allows for the ready removal of any of the cages for repairs or replacement. The rollers 4 are so proportioned in respect to the collars 2 that they only bear against the side of one collar, and there is sufficient clearance to allow it to rotate free of the surface of the other collar so that there is no frictional resistance, except the bearing of the roller on the intermediate roller bearings, as described hereinafter.

12, 12 is a series of spindles which carry the rollers 4 and which, in turn, are supported by the inner and outer bearing rings 9 and 8 of the cage 3. These spindles are of sufficient diameter to withstand the thrust strains. They are prevented from turning in the cage by screw keys 13, or other devices. Each spindle extends through its roller and located between each roller 4 and its spindle 12 is a series of rollers 14, preferably extending substantially the full length of the roller 4 and of any suitable type, the present rollers being made of spirally wound sheet steel. At each end of the rollers 14, are rings or washers 15 and 16. The washer 16 rests against a collar 17 on the spindle 12 and between this collar and the outer ring 8 of the cage is a bearing plate 18. Between the bearing plate and the roller 4 is a series of anti-friction balls 19 mounted in any suitable cage 20. These balls take the end thrust of the roller 4, while the anti-friction rollers 14 are subjected to the longitudinal thrust of the shaft 1.

By this construction, the longitudinal thrust of the shaft 1 is taken by the heavy rollers 4 and the series of roller bearings 14, which are mounted on the heavy spindle 12 firmly supported in the cage 3, while the end thrust of each tapered roller, due to the longitudinal thrust of the shaft, is taken by its own independent set of balls. The cage is of sufficient strength to resist the end pressure of the rollers. This makes a very substantial thrust bearing, which can be applied to the heaviest types of propeller, or other shafts, which are subjected to end pressure.

In Figs. 7 and 8, I have shown the rollers of my invention mounted in a segmental cage $3^a$, which is so proportioned that it can be lifted off the fixed member $21^a$ after removing the bolts $6^a$ and backing off the nuts on the screw rods $23^a$. The rollers $4^a$ of this construction bear upon the major portion of each collar $2^a$ of the shaft $1^a$ and resist the thrust of the shaft. The detail construction of the roller bearing is similar to that shown in Fig. 3.

The construction can also be applied to step bearings, as illustrated in Figs. 9 and 10. In Fig. 9, I have shown a thrust bearing in which the shaft $1^b$ extends through the bearings $3^b$ and has a collar $2^b$ which rests upon the rollers $4^b$. The bearing can be secured to any suitable foundation.

In Fig. 10, I have illustrated a type of thrust bearing in which the shaft $1^c$ terminates at the bearings, and the end of the shaft is beveled, as at $2^c$, to coincide with the rollers $4^c$ of the bearing cage $3^c$.

I claim:

1. The combination in a bearing, of a shaft; a cage having conical rollers for receiving the thrust of the shaft; a spindle extending entirely through each roller and mounted in the cage; a series of anti-friction rollers between each spindle and its tapered roller; and a series of balls, and a cage therefor, mounted between the large end of each tapered roller and the cage.

2. The combination in a thrust bearing, of a shaft having a collar thereon with a beveled bearing face; a cage having a series of recesses; a tapered roller mounted in each recess and arranged to bear against the beveled collar on the shaft; a spindle extending through each roller and having a bearing at both ends in the cage; a series of roller bearings mounted between each tapered roller and its spindle; and a series of anti-friction balls, and a cage therefor, mounted between the large end of each tapered roller and the cage.

3. The combination of a shaft having an inclined bearing surface; a cage having inner and outer bearings connected by webs; a series of radial spindles mounted in the inner and outer bearings and prevented from turning in the cage; a conical roller mounted on each spindle and arranged to bear against the inclined bearing surface of the shaft; a series of anti-friction rollers extending substantially the full length of each conical roller and located between the conical roller and the spindle; a bearing plate resting against the outer bearing of the cage; and a series of balls, and a cage therefor located between the bearing plate and the large end of each conical roller.

4. The combination of a shaft having a series of collars thereon, each collar being tapered in cross section; a series of cages located in each groove formed by the collars, each cage having an inner and an outer bearing and connecting webs; radial spindles extending across the space between the inner and outer bearings and located in said bearings; a conical roller mounted on each spindle and so proportioned in relation to the recess between the two collars that it will have a bearing only against one collar; and anti-friction rollers mounted between each conical roller and its spindle.

5. The combination in a thrust bearing for shafts, of a shaft having a series of collars tapered in cross section, each forming a series of inclined bearing surfaces; a support; a series of cages secured to the support and acting as a bearing, each cage having an inner and an outer bearing, the bearings being connected; a series of radial spindles located in the inner and outer bearings of the cage; and a tapered roller on each spindle, said rollers being so proportioned as to bear against one face of the collars.

6. The combination of a shaft having a series of collars thereon, each collar being tapered in cross section; a cage located in the space between each collar, each cage being made in two parts; means for clamping the two parts rigidly together; a series of radial spindles mounted in the cage and supported at each end; a tapered roller mounted in each spindle, said rollers being so proportioned in relation to the space between the collars that they will only bear against one collar; a series of roller bearings mounted between each spindle and its conical roller; a bearing plate resting against the outer ring of the cage; a sleeve mounted between the plate and the ends of the roller bearing; a series of balls; a cage therefor mounted between the large end of each tapered roller and the bearing plate; and means for supporting the several cages.

7. The combination of a shaft having collars thereon; a series of cages; rollers mounted in the cages and arranged to bear against the collars; a fixed member to which the cages are secured; two parallel screw rods extending through the cages; and adjusting nuts on the rods on each side of each cage.

8. The combination of a shaft having collars thereon; a series of cages; a fixed member on which the cages are mounted, each cage having a series of conical rollers mounted thereon; and means for adjustably holding the cages in position in respect to the collars of the shaft, each cage being segmental so that it can be readily removed from the shaft.

In witness whereof I affix my signature.

JOSEPH W. THROPP.